Sept. 17, 1968  T. B. FIFIELD  3,401,529

COUPLING

Filed Dec. 17, 1965

INVENTOR
THOMAS B. FIFIELD
BY
Andrus & Starke
ATTORNEYS

United States Patent Office 3,401,529
Patented Sept. 17, 1968

3,401,529
COUPLING
Thomas B. Fifield, 1535 W. Dean Road,
Milwaukee, Wis. 53217
Filed Dec. 17, 1965, Ser. No. 514,551
5 Claims. (Cl. 61—70)

ABSTRACT OF THE DISCLOSURE

Two members are coupled together by two dovetail interlocking connections disposed at substantially right angles to each other and in which the male member of one connection extends across between the sides of the female slot of the other connection and the interlocking parts are deformable for the purpose of assembly and disassembly.

---

This invention relates to a coupling which has many possible uses.

The coupling has been employed in the securing of weights used by divers, in which use it has the advantage of simplifying the attachment and removal of separate weights and avoiding loose fastening elements that are difficult to handle and can become readily lost under water.

The accompanying drawing illustrates the best mode presently contemplated by the inventor for carrying out the invention.

Figure 1:
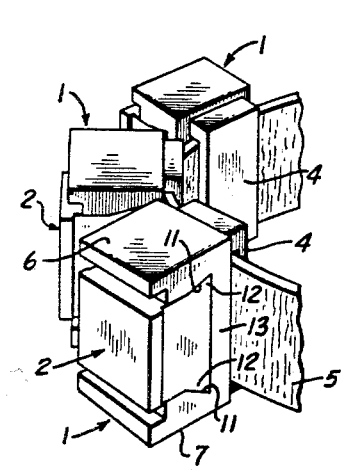
FIG. 1 is a perspective view of a portion of a diver's belt showing a number of weights separately secured thereto by the present coupling of the invention.
Figure 2:
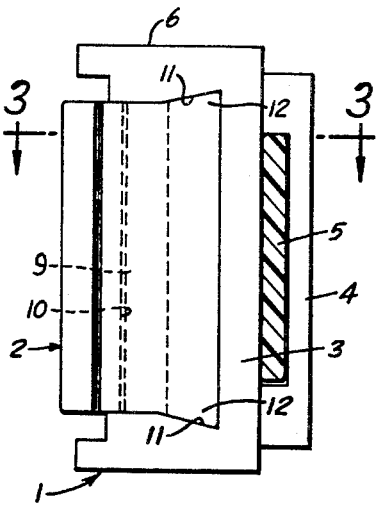
FIG. 2 is a vertical transverse section through the belt and showing a weight and its coupling, in side elevation.
Figure 3:
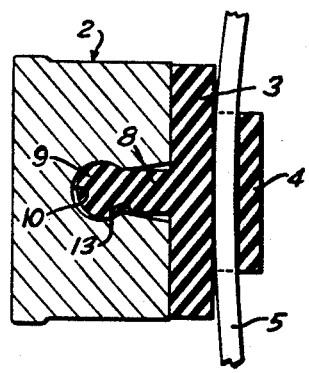
FIG. 3 is a transverse horizontal section taken on line 3—3 of FIG. 2.
Figure 6:
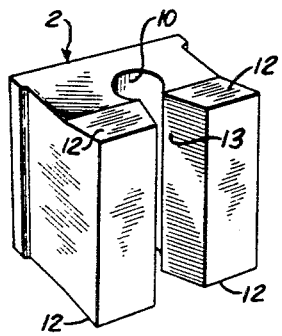
FIG. 6 is a perspective view of the face of the weight.
Figure 5:
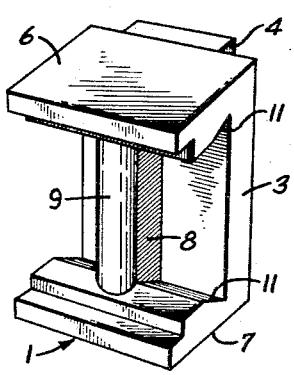
FIG. 5 is a perspective view of the face of the holder.
Figure 4:
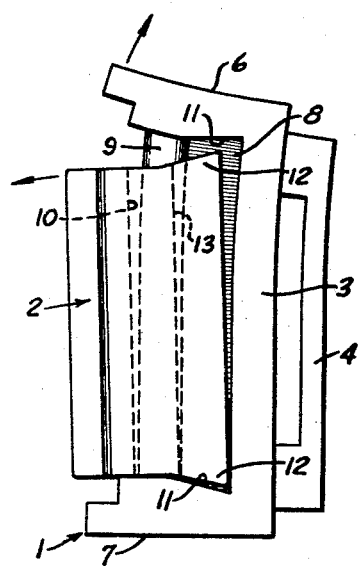
FIG. 4 is a view similar to FIG. 2 showing the manual stretching of the tongue of the holder to effect removal or insertion of a weight.

The coupling comprises the holder 1 and the object 2 to be held, which in this instance is a weight for a diver.

The holder 1 comprises a base 3 which in the instance shown has a loop 4 on its back adapted to receive the belt 5 of a diver. The base 3 has two upstanding end flanges 6 and 7 which are secured to opposite ends of the base in such manner as to permit them to be flexed outward away from each other. In the instance shown, this flexibility is accomplished by having both flanges and the base made of rubber or other suitable resilient yieldable material. The flanges 6 and 7 are joined midway by a longitudinal tongue 8 extending outwardly from the base 3 and having a male enlargement 9 along its outer free edge. In the instance shown, this enlargement is of generally circular section.

The tongue 8 and its enlargement 9 are made of rubber or similar material capable of stretching longitudinally when flanges 6 and 7 are flexed outwardly away from each other, for the purpose of facilitating entry of the enlargement 9 into a corresponding recess 10 in the object 2.

A recess 11 is provided in the inner face of each flange 6 and 7 adjacent the face of base 3, as illustrated.

The object 2, which in the illustrated instance is a rectangular block of lead as shown, has a recess 10 extending longitudinally in its inner face for the full length thereof. The object 2 is of a length to fit between the flanges 6 and 7 of holder 1.

The ends of object 2 are inclined outwardly adjacent the inner face to provide extensions 12 to fit in the corresponding recesses 11 of holder 1.

The recess 10 has a shape providing a throat 13 to confine the enlargement 9 and interlocks the same in the recess when the object 2 is secured in holder 1. For this purpose the throat 13 is of less width than the enlargement 9 so that the latter has to distort in passing through the throat.

The flanges 6 and 7 are flexible, or may be hinged to base 3, to provide for manual separation, thus stretching the tongue 8 and enlargement 9 in length and thereby reducing the thickness of enlargement 9 to facilitate its passage through the throat 13.

When securing the object 2 to holder 1, one end of the object is first positioned against the corresponding flange 6 or 7 and then the other flange is pulled in a direction stretching the tongue 8 and enlargement 9, whereupon the object is moved into place where the extensions 12 become interlocked in the corresponding recesses 11, and the enlargement 9 is interlocked in recess 10. In this position, the tongue 8 and enlargement 9 provide a tension means which urge the flanges 6 and 7 inwardly against the ends of the object 2. The object is thus secured in place by a double dovetail interlock that inhibits its motion in all directions and thus prevents its accidental dislodgement.

When removing the object 2 from holder 1, one of the flanges 6 or 7 is pulled away from the object to stretch tongue 8 and enlargement 9 and release the corresponding extension 12, whereupon the object 2 can be pulled out of holder 1 by an angular movement generally the reverse of the angular movement employed in assembling the two.

Figure 7:
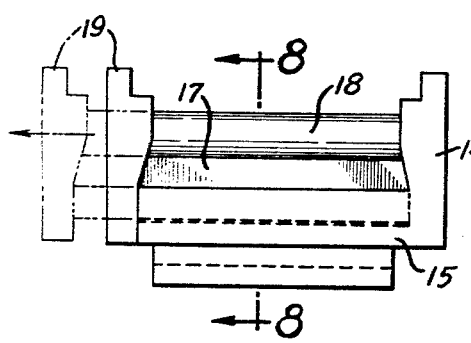
FIG. 7 is a schematic side elevation of a modified form of coupling in which one end flange is displaceable bodily from the base in a longitudinal direction.
Figure 8:
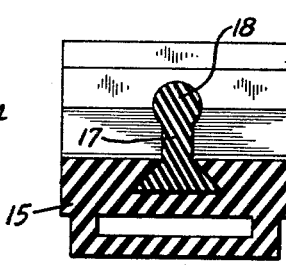
FIG. 8 is a transverse section taken on line 8—8 of FIG. 7.

Referring to the modified construction of FIG. 7, the end flange 14 is attached to the base 15 and to the tongue 17 and enlargement 18. The end flange 19, however, is attached only to the tongue 17 and the enlargement 18. The tongue 17 is dovetailed at its base so as to fit into a corresponding slot in the base 15 which permits the tongue 17 to slide longitudinally in the base 15, but prevents its being separated therefrom vertically. In this modified construction, only the tongue 17 and the enlargement 18 need to be made of rubber or other suitable resilient, yieldable material. The base 15 and the end flanges 14 and 19 can, if desired, be made of rigid material.

The flange 19 separates from the base 15 by longitudinal movement tensioning the tongue 17 and enlargement 18, thus permitting insertion or removal of the object 2. The tongue 17 and enlargement 18, being made of resilient material, in turn provide a tension means which holds end flange 19 firmly against object 2 when the latter is inserted in the holder.

The principle of the coupling lies in employing two separate dovetail-like interlocks at right angles to each other and to the direction of assembly and disassembly of the members to be coupled, and providing for the release of both dovetail interlocks at the same time by manual actuation. More specifically one dovetail is released by opening the side walls of the female groove by means of force exercised against the tension of the tongue or male member, while the other dovetail is released by the stretching of the tongue or male member to reduce its lateral dimensions and thereby facilitate its movement in or out of the corresponding female member. For this purpose the stretchable tongue and enlargement thereof are made of rubber-like material and have their ends secured to the movable side walls of the other dovetail so that when the latter are separated the tongue stretches and thereby releases itself.

In the construction illustrated the holder 1 is made of a stiff rubber which resists deflection, but which will deflect the amount necessary for assembly and disassembly of object 2 therewith. Object 2, as illustrated, is of rigid non-deflecting material. The two when assembled together provide a coupling or fastening which holds object 2 coupled to holder 1 against forces exerted against the object regardless of the direction of force, so that the coupling or fastening remains reasonably permanent unless manually disassembled as described.

The object 2 is illustrated as a weight for use in diving in which the keyhole slot 10 is useful in stacking a supply of weights upon a hanger which can be let down in the water adjacent a diver for his use in adjusting the weights he needs. The hanger in that instance has a post which fits the enlargement of the slot and upon which the weights are impaled.

Various modes of carrying out the invention are contemplated as being within the scope of the following claims particularly pointing out and distinctly claiming the subject matter which is regarded as the invention.

I claim:

1. A coupling comprising a holder member and a fastening member removably interlocked by two dovetail-like connections disposed at right angles to each other and to the direction of assembly and disassembly thereof with one of the dovetail connections extending across the other between the side walls thereof, said holder member comprising the spaced side walls for the outer dovetail connection and having a stretchable tongue extending across between said side walls and secured at its ends thereto, and said fastening member comprising a rigid body having extensions fitting the space between said side walls to constitute the outer dovetail connection and a throated groove extending between said extensions and receiving said tongue to constitute the inner dovetail connection, said side walls being manually movable to release said fastening member from said outer dovetail connection and to stretch said tongue and thereby release it from said throated groove to facilitate assembly and disassembly of said inner dovetail connection, and said tongue applying a tensioning force retaining said dovetail connections in assembled relation.

2. The construction of claim 1 in which said side walls are of highly resilient rubber secured to a base member and provide flanges thereon of limited flexibility for the manual separation thereof with the resilience of the flanges additionally aiding in retaining the dovetail connections upon assembly of the members.

3. The construction of claim 1 in which one of said side walls is attached directly only to the stretchable tongue which, in turn, is attached to the base member and to the other side wall in such manner as to be able to slide longitudinally in the base member.

4. A diver weight attachment comprising a plurality of holders adapted to be secured to the body of the diver, a plurality of weights, and a manually releasable double dovetail interlock between each weight and a corresponding holder with the respective dovetail interlocks disposed generally at right angles to each other, whereby the weights are secured against accidental dislodgement in use.

5. The construction of claim 4 in which the diver weight comprises a block of heavy metal having a keyhole shaped slot extending longitudinally for the full length of one face thereof and having its opposite ends flared outwardly adjacent said face.

References Cited

UNITED STATES PATENTS

| 617,675 | 1/1899 | Crawford. | |
| 2,120,420 | 6/1938 | Topper. | |
| 3,039,273 | 6/1962 | Swindell. | |
| 3,042,277 | 7/1962 | Stradella | 224—4 |
| 3,192,723 | 7/1965 | Apperson | 61—70 |
| 3,220,197 | 11/1965 | Christiansen | 61—70 |

DAVID J. WILLIAMOWSKY, *Primary Examiner.*

J. K. BELL, *Assistant Examiner.*